(12) United States Patent
Clary

(10) Patent No.: US 11,987,331 B2
(45) Date of Patent: May 21, 2024

(54) ADJUSTABLE LIFTING ASSEMBLY FOR NAUTICAL VEHICLES

(71) Applicant: CLARY LAKE SERVICE, INC., Milford, IA (US)

(72) Inventor: Thomas W. Clary, Milford, IA (US)

(73) Assignee: CLARY LAKE SERVICE, INC., Milford, IA (US)

( * ) Notice: Subject to any disclaimer, the term of this patent is extended or adjusted under 35 U.S.C. 154(b) by 359 days.

(21) Appl. No.: 17/302,277

(22) Filed: Apr. 29, 2021

(65) Prior Publication Data

US 2022/0348298 A1 Nov. 3, 2022

(51) Int. Cl.
*B60P 3/10* (2006.01)
*B63C 3/06* (2006.01)
*B63C 3/12* (2006.01)

(52) U.S. Cl.
CPC .............. *B63C 3/06* (2013.01); *B60P 3/1033* (2013.01); *B63C 3/12* (2013.01)

(58) Field of Classification Search
CPC . B63C 3/00; B63C 3/02; B60P 3/1033; B60P 3/1066
USPC ........................................................ 414/532
See application file for complete search history.

(56) References Cited

U.S. PATENT DOCUMENTS

| | | | |
|---|---|---|---|
| 3,409,153 A | 11/1968 | Stearn et al. | |
| 3,697,048 A | 10/1972 | Sarno | |
| 4,381,166 A * | 4/1983 | Smart | B66F 9/143 74/89.32 |
| 5,326,217 A * | 7/1994 | Simpson | B66F 9/08 414/667 |
| 5,358,217 A * | 10/1994 | Dach | B66F 3/00 254/134 |
| 6,027,303 A * | 2/2000 | Voegeli | B66F 9/10 414/667 |
| 6,848,379 B1 | 2/2005 | Ylipelkonen | |
| 6,969,225 B2 * | 11/2005 | Mensch | B66F 9/144 414/667 |

(Continued)

FOREIGN PATENT DOCUMENTS

| | | |
|---|---|---|
| NL | 1008152 C2 | 7/1999 |
| NL | 1019706 C2 | 7/2003 |

OTHER PUBLICATIONS

2018 Fork Facts USA, "Leading the World in Quality Lift Truck Attachments, Forks and Accessories", Cascade™, www.cascorp.com, 48 pages, 2018.

(Continued)

*Primary Examiner* — Mark C Hageman
(74) *Attorney, Agent, or Firm* — McKee, Voorhees & Sease, PLC

(57) ABSTRACT

Pontoon forks are specifically designed for the marine industry to efficiently and safely lift and maneuver pontoon boats. The pontoon forks are engineered to lift tri-toons and pontoon boats of lengths up to and greater than twenty-eight feet. The forks can further accommodate weights of up to and greater than six-thousand pounds. Removable pockets included with the pontoon forks allow for the lifting and transport of pontoon boats of various sizes without having to have specialized equipment for each and every make and model of the pontoon boat. The pontoon forks are retrofit to fit specific forklifts already owned or easily acquired by marinas.

12 Claims, 13 Drawing Sheets

(56) References Cited

U.S. PATENT DOCUMENTS

| | | | | |
|---|---|---|---|---|
| 7,469,917 | B1* | 12/2008 | Heuiser | B60P 3/1033 |
| | | | | 280/414.1 |
| 8,657,553 | B1* | 2/2014 | Rasmussen | B65G 7/04 |
| | | | | 414/535 |
| 9,045,320 | B2* | 6/2015 | Turrini | B66F 9/0655 |
| 9,334,146 | B2* | 5/2016 | Meijer | B66F 9/12 |
| 10,023,449 | B1* | 7/2018 | Knoll | B66F 9/142 |
| 2001/0038788 | A1* | 11/2001 | Robinson | B66F 9/18 |
| | | | | 414/607 |
| 2014/0017009 | A1* | 1/2014 | Hey | B63C 3/06 |
| | | | | 405/3 |

OTHER PUBLICATIONS

Duralift Pontoon Forks, DuraLift Marine, availabe online at https://www.youtube.com/watch?v=I5EDhuU9SuE, Dec. 4, 2020.

Minuteman Boat Handling Equipment, Inc., "Fork Extensions", Slip on Fork, L Type Fork, the Negative Adjustable Fork, available online at https://www.youtube.com/watch?v=I5EDhuU9SuE, Mar. 2, 2021.

Hewitt Parts & Accessories Brochure, available online at www.hewittrad.com, 1971.

Milford Welding & Manufacturing, Pontoon Forks, available online at milfordmftg.com/pontoon-forks.php, Apr. 9, 2021.

Pontoon Forks, Duralift Marine, available online at https://www.duralift.com/pontoon-forks.php 1/, Apr. 9, 2021.

Pontoon Forks, DuraGrade, available online at williamsboatdollies.com/pontoon-forks.php, Apr. 9, 2021.

* cited by examiner

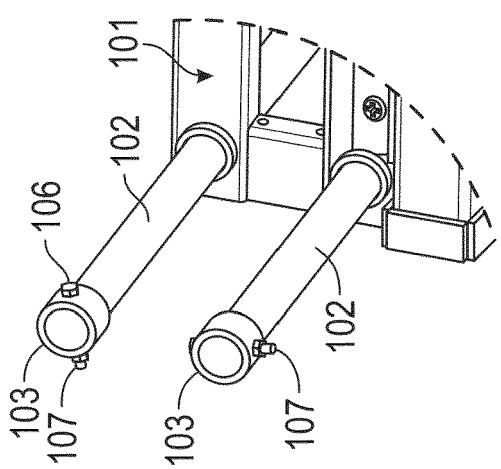
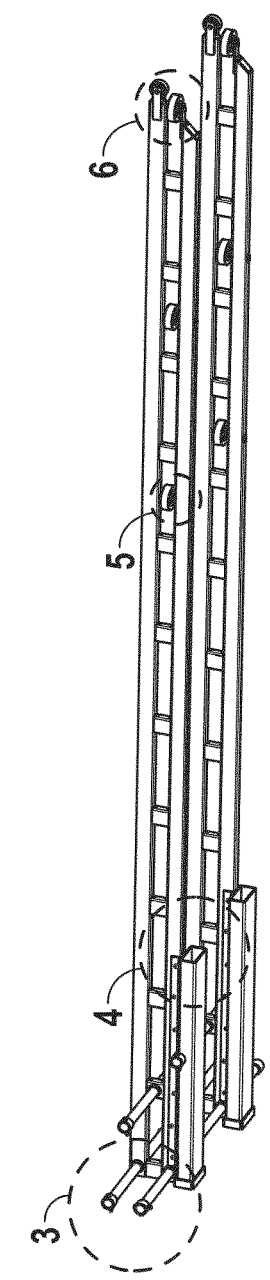
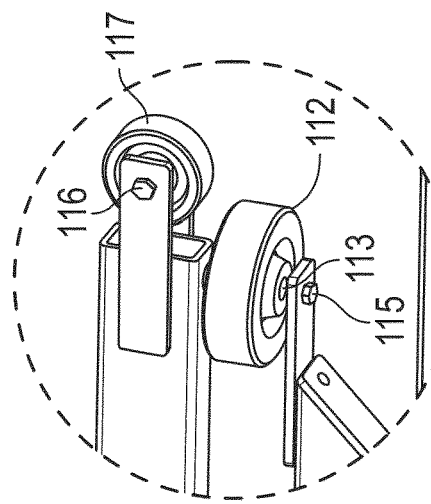
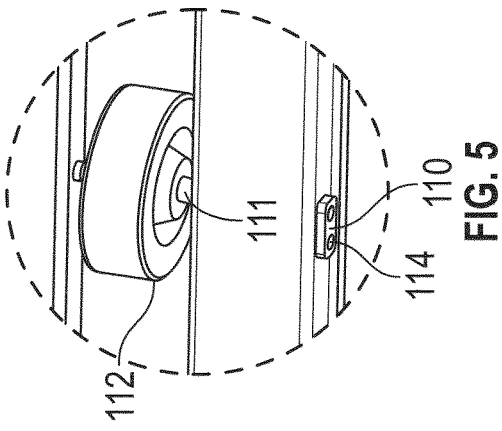
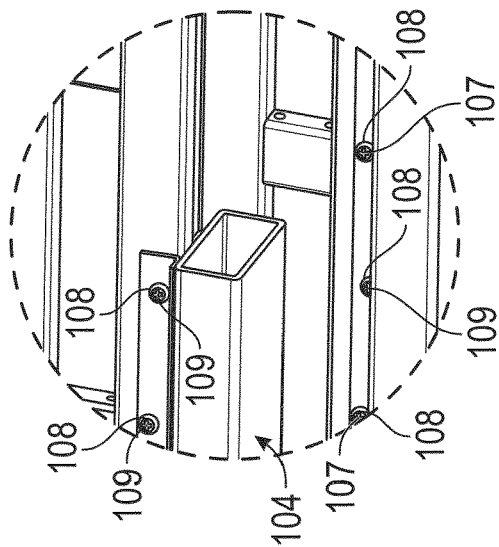

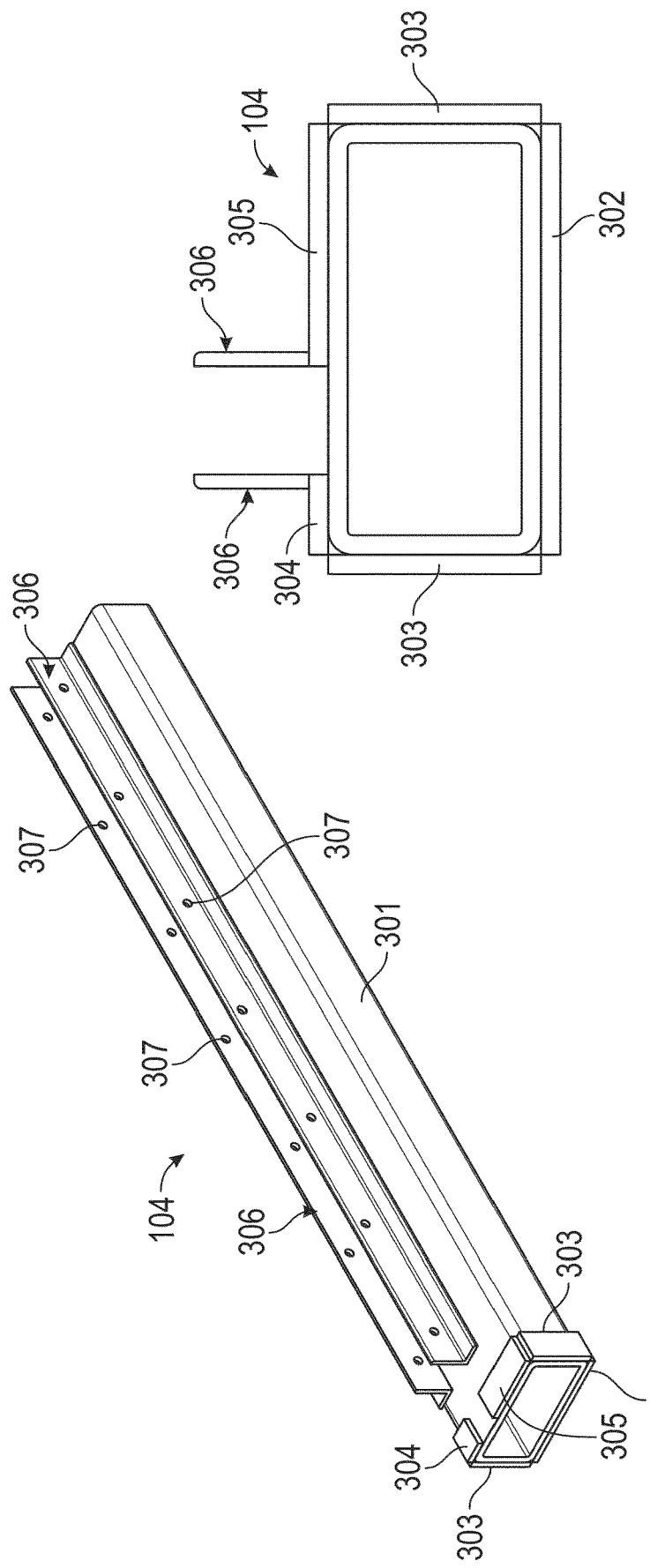

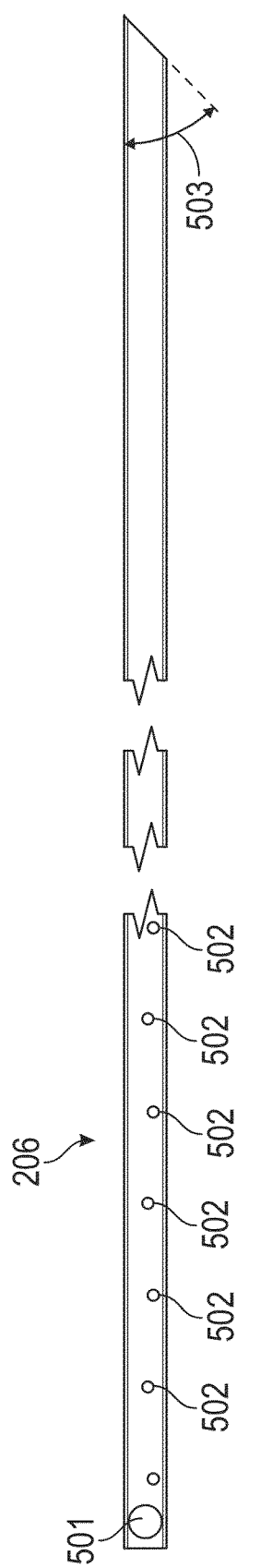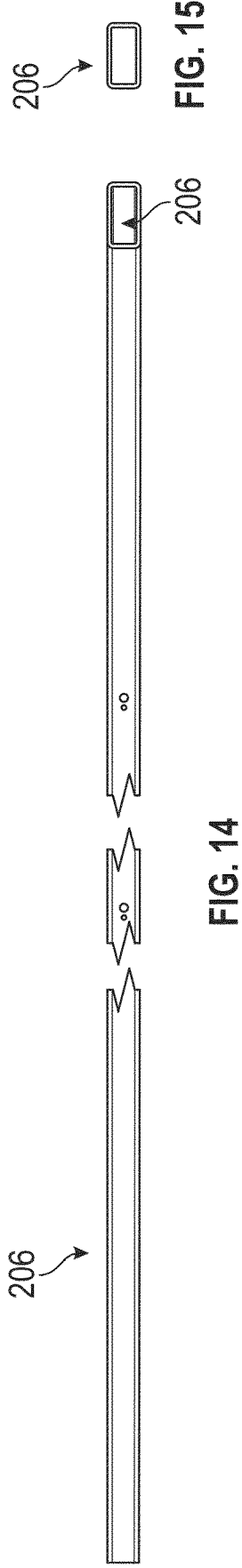
FIG. 13
FIG. 14
FIG. 15

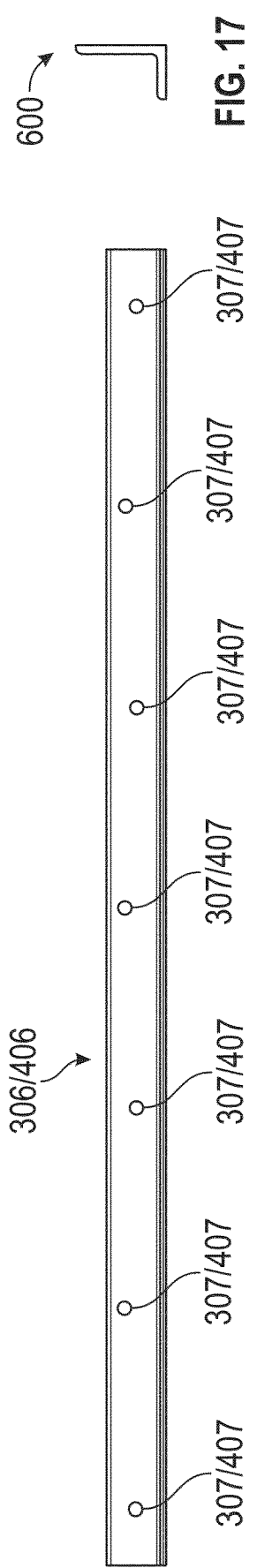

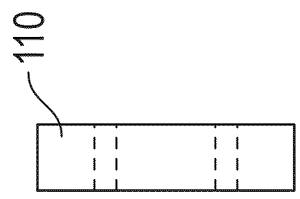
FIG. 24
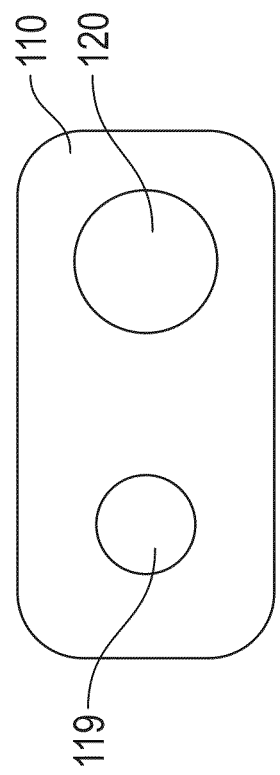
FIG. 22
FIG. 23
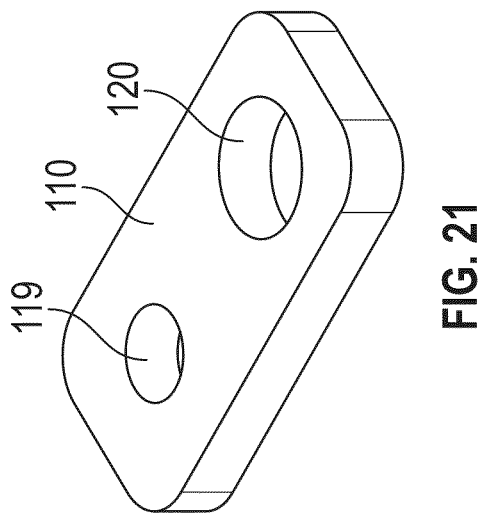
FIG. 21

ADJUSTABLE LIFTING ASSEMBLY FOR NAUTICAL VEHICLES

FIELD OF THE INVENTION

The present invention relates generally to a lifting apparatus and/or corresponding method of use in at least the marine industry. More particularly, but not exclusively, the present invention relates to an adjustable pontoon fork.

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

During the Viking Age, sea navigators were known to portage their ships in order to bypass an unnavigable stretch of a river, to reach another body of water not connected to the first body of water, and/or to store the ships on land during winter months to protect the ships from the harsh climate common to many regions of Scandinavia. Vikings employed many different techniques to transport ships across land and selection of the appropriate technique largely depended on the design and size of the ship. For example, a snekkja (also styled snekke) was designed light enough such that small poles could be put through the oar holes of the ship so that the ship could simply carried by the crew. Other types of small ships during this time period employed very narrow keels, such that the ships could cut through sand when being pushed or pulled. A larger ship, such as a skeid (also styled skeid), presented more of a problem, especially if the larger ship was fully loaded. To overcome this problem, Vikings were able to move the ship by cutting down trees and stripping them of their branches and bumps, laying out logs out in front of the ship, pulling the ship along the logs, and as the ship was pulled along, moving the logs at the back of the ship to the front.

Since the Viking Age, there has been much technical development regarding how to lift nautical vehicles into and out of the water. Many docks include boat hoists with hand wheels and winch pulleys such as the one shown in U.S. Pat. No. 3,697,048. Other boat hoists and/or boat trailers employ other mechanisms which aid in the lifting and transport of these nautical vehicles, including boat slings, wheels, complex mechanical frames, and/or the like. One such example of a boat hoist employing a boat sling and wheels is shown in U.S. Pat. No. 3,409,153. Some complex mechanical frames are adjustable and can accommodate boats of different makes and models, such as that shown in U.S. Pre-grant Pub. No. 2014/0017009.

However, for many boating enthusiasts, the voyage begins in the boathouse, not at the dock. Modern boathouses rack and stack speed boats, pontoons, and other nautical vehicles with marina-specific forklifts ("boat forks"), thereby allowing for mass storage. Before these nautical vehicles can ever even be loaded onto a boat trailer, many must descend several stories and/or be transported several hundred yards.

Boat trailers and these other lifting and transport mechanisms have thus become an important aspect for getting as much lake time as possible. These structures must be checked and maintained. Most are required to be a proper "match" for the boat's weight and hull design, or else safety is compromised. For example, too little of a trailer capacity will be unsafe on the highway and could cause abnormal tire wear. Too high of a trailer capacity can damage light, particularly aluminum, boats. Marinas transporting many different makes and models of boats must thus carry many different sizes of trailers and other lifting and transporting mechanisms.

Thus, in comparison to the developments made for transport of nautical vehicles from sea to land, developments in lifting and transporting nautical vehicles on from one location on land to another are almost non-existent and are almost solely limited to the use of traditional boat forks.

Boat forks are designed for lifting and lowering boats in marina applications. Known boat forks are available in conventional or negative drop mountings. These boat forks are typically shaft mounted or Industrial Truck Association ("ITA") hook or clip mounted. The blades of these boat forks are even sometimes covered in ½ inch thick rubber for added load protection.

Boat forks come in various sizes with various capacities. Appropriate selection of a boat fork must at a minimum must address the size of the boat. Additionally, it should be appreciated that boats are commonly heavy in the stern, light in the bow, and longer and narrower than regular forklift loads. This creates an unusual weight distributions and places heavier stresses on the carriage, mast, and forks of a marina lift than regular forklift loads. The selection of the traditional boat fork should thus also address the boat's specific weight distribution.

Conceptually, the need to choose specific boat forks to lift, transport, and store each and every boat of a different make and model shows that the state of the art has not fully addressed many of the problems Vikings dealt with when portaging ships during the Viking Age. The art is thus ripe for improvement.

Attempts to address these issues are few and inadequate. For example, fork extensions are sometimes employed to crudely extend the length of the fork. These fork extensions are however not ideal because the durability of the fork is impacted by the use of multiple longitudinal members in succession. Failure can simply occur at the point or plane of extension.

Thus, there exists a need in the art for a universal apparatus which simplifies the daily task of moving pontoon boats and other nautical vehicles without the need for several different sizes of forks and/or forklifts.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

It is a further object, feature, and/or advantage of the present invention to efficiently and safely lift and maneuver pontoon boats and other nautical vehicles for dry storage applications. For example, the forks can be engineering to lift tri-toons and pontoon boats of lengths up to and over 28 feet and weighing up to and over 6000 pounds.

It is still yet a further object, feature, and/or advantage of the present invention to allow boathouses to carry only a limited supply of forks and/or forklifts and still be able to transport all of the nautical vehicles stored at the marina.

The lifts disclosed herein can be used in a wide variety of applications. For example, the forks can be engineered to fit specific forklifts having specific weight capacities. The forks disclosed herein can also be adapted to accommodate for several different boat styles (pontoon, flat bottom, V-Bottom, inboard, inboard/outboard, outboard, etc.).

It is preferred the apparatus be safe, cost effective, and durable. For example, rollers can be employed on the forks to prevent damage to the sides of the pontoon.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the present invention. For example, forks can be either painted or galvanized and have various default lengths.

Methods can be practiced which facilitate use, manufacture, assembly, maintenance, and repair of lifts for nautical vehicles which accomplish some or all of the previously stated objectives.

Forks for lifting and transporting nautical vehicles can be incorporated into other nautical lifts or systems which accomplish some or all of the previously stated objectives.

According to some aspects of the present disclosure, a lift assembly for a forklift capable of transporting nautical vehicles comprises a pair of elongated forks having distal and proximate ends, said pair of elongated forks being oriented substantially parallel to one another; shafts passing through and connecting the pair of elongated forks to one another near the proximate ends; and interchangeable pockets supporting an underside of said elongated pair of forks and configured to prevent movement between the pair of elongated forks and the shafts when moved in a locked, operative position.

According to some other aspects of the present disclosure, a method of transporting a watercraft on land comprises selectively securing removable pockets to forks of a forklift to determine a distance between said forks based upon a size of the watercraft; loading the watercraft onto the forks of the forklift; and transporting said watercraft from a first location on land to a second location on land.

According to some other aspects of the present disclosure, a pontoon fork comprises parallelly oriented upper and lower beams each having a first and second end, said upper and lower beams mechanically connected by a plurality of vertical spacers longitudinally dispersed through said pair of elongated forks; apertures establishing a removable mechanical connection between the pontoon fork and adjustable pockets capable of supporting a lower surface of the lower beam; wherein a second vertical spacer of the plurality of vertical spacers is perforated so as to allow shafts connecting two or more pontoon forks to one another; horizontally oriented wheels longitudinally dispersed between said parallelly oriented upper and lower beams, said horizontally oriented wheels being staggered with at least some of said plurality of vertical spacers; vertically oriented wheels positioned at the second end of the upper beam; and an end cap positioned at the second end of the lower beam.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

FIG. 2 shows a front, perspective view of the lift assembly of FIG. 1 and references areas further detailed by way of FIGS. 3-6.

FIG. 3 shows a detailed, perspective view of the connecting shafts shown in the assembly of FIG. 2.

FIG. 4 shows a detailed, perspective view of the left pocket shown in FIG. 2.

FIG. 5 shows a detailed, perspective view of a main horizontal roller shown in FIG. 2.

FIG. 6 shows a detailed, perspective view of the end horizontal roller and vertical roller shown in FIG. 2.

FIG. 9 shows a perspective, component view of the left pocket shown in FIG. 1.

FIG. 10 shows an end, elevational view of the left pocket shown in FIG. 9.

FIG. 13 shows a top, elevational view of the lower beam shown in FIG. 7.

FIG. 14 shows a side, elevational view of the lower beam shown in FIG. 7.

FIG. 15 shows an end, elevational view of the lower beam shown in FIG. 7.

FIG. 16 shows a side, elevational view of the pocket bracket shown in FIGS. 9 and 11.

FIG. 17 shows an end, elevational view of the pocket bracket shown in FIGS. 8 and 10, emphasizing the bolt angle.

FIG. 21 shows a perspective, component view of the wheel pin plate of the wheel pin assembly shown in FIG. 5.

FIG. 22 shows a side, elevational view of the wheel pin plate of FIG. 21 with internal features shown within hidden lines.

FIG. 23 shows a top, elevational view of the wheel pin plate of FIG. 21.

FIG. 24 shows a side, elevational view of the wheel pin plate of FIG. 21 with internal features shown within hidden lines.

An artisan of ordinary skill need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated.

Figure 1:
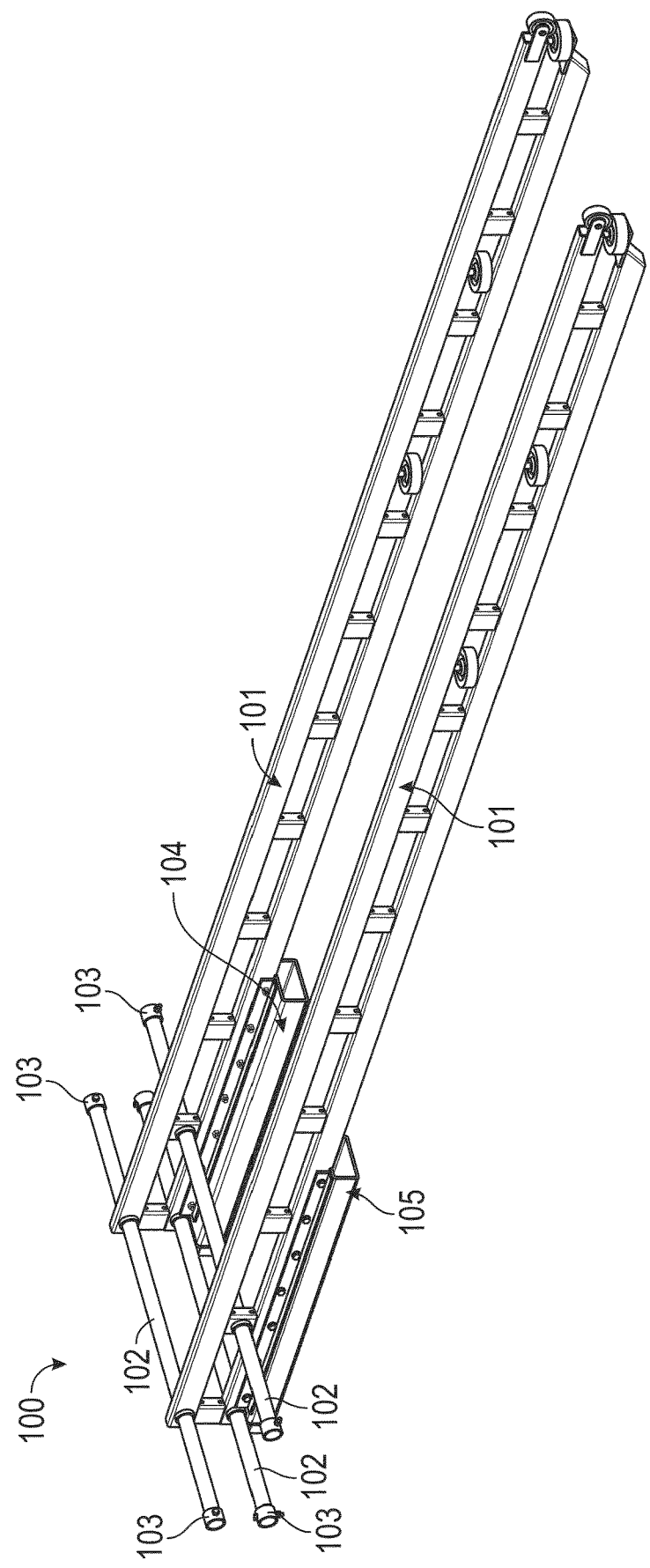
FIG. 1 shows a perspective, assembly view of a lift, the forks of which are capable of lifting pontoons of significantly varying sizes, according to some aspects of the present disclosure.

Referring now to the figures, an improved lift assembly 100 for a boat fork or a boat hoist and its components are shown at a high level in FIG. 1. The forks 101, also known as blades or tines, are the load bearing members on the front of boat forks. Generally speaking, there are very little standards standardization of design in how to affix the forks 101 to the front of a forklift. Most forks are the hook-type ITA class II-IV forks. The lifting assembly 100 shown in FIGS. 1-32 however improves upon those known forks by providing a robust, secure, and adjustable method for affixing the forks 101 to the boat fork. If widely implemented, the use of connecting shafts 102, shaft collars 103, and adjustable forks 104, 105 could provide a useful standard for how to safely affix forks 101 to the front of boat forks (i.e., for use in marina applications).

FIG. 2 serves as a road map that locates where some of the unique aspects/components detailed in FIGS. 3-6 are located within the overall lifting assembly 100.

In particular, FIG. 3 shows how connecting shafts 102 and collars 103 pass through and connect pairs of elongated forks 101 near the ends of the forks 101 proximate to the forklift. The collars 103 are removably bolted via connecting shaft bolt 106 and locknut 106 to the ends of the shafts 102. Additional details of collar(s) 103 are further emphasized in FIGS. 18-20, discussed infra.

The use of at least three noncollinear shafts 102 can better stabilize an operating position of the forks 101 such that there are substantially no axes and/or planes of movement about which the forks 101 will tend to easily buckle, shear, and/or otherwise fail when there exists extreme loads and moments placed upon same due to the weight of nautical vehicles.

FIG. 4 shows how the interchangeable pockets 104, 105 can be configured so as to support an underside of the forks 101 and to prevent movement between the pair of elongated forks and the shafts when moved in a locked, operative position. The locked, operative position can be achieved by fastening a bracket (see FIG. 9) to the forks 101 by at least male-type fasteners 107. Washers 108 are optionally included.

FIG. 5 emphasizes view of wheel pin assembly 110, which includes rollers 112. Rollers 112 dispersed throughout forks 101 are preferably horizontally oriented and equidistantly positioned. Beneficially, the rollers 112 can comprise spacers 111 or dampers located therewithin. The spacers 111 can, as an example, comprise deformable, inwardly biased pins that are inwardly biased (toward each other fork 101). The inwardly biased pins. When pushed slightly outward, the inwardly biased pins will allow the wheels to similarly be pushed outward such that when a nautical vehicle is being loaded or unloaded from the forks 101, the fit between the base of the nautical vehicle and the forks 101 is snug. The rollers 112 will still however permit limited movement along a longitudinal (axial) axis of the forks 101. In effect, the deformable spacers 111 or dampers and rollers 112 thus work together to prevent damage to nautical vehicles as the nautical vehicles are loaded to and from the forks 101. When a nautical vehicle is removed from the forks 101, the bias in the spacers 111 will achieve physical equilibrium and return the spacers 111 to a slightly more inward position.

The rollers 112 and spacers 111 can secure to the forks 101 by a wheel pin plate 110 with apertures 117, 118 (see FIGS. 21-24, discussed infra) for fastening 114. One or more of the wheel pin plates can be integrally formed with the wheel pins and/or forks 101. Alternatively, the wheel pin plates, wheel pins, fasteners, and other components of the wheel pin assembly 110 can all be assembled as separate units. As shown, there can be two apertures within the wheel pin plate that allow for male-type fasteners 115 such as screws, bolts, and the like to pass therethrough. In some embodiments, female-type fasteners, such as female threads in the forks 101 and/or wheel pin plate, nuts, and the like, can be included to secure said male-type fasteners. Further details of wheel pin plate of the wheel pin assembly 110 are further emphasized in FIGS. 21-24, discussed infra.

FIG. 6 emphasizes view of a horizontally oriented roller 112 and vertically oriented roller 117 at a distal end of one of the forks 101. The vertical roller 117 is preferably included at a distal end so that the base of a nautical vehicle more easily "floats" and damage to the nautical vehicle is further prevented when being loaded and unloaded onto and from the forks 101. Though it is to be appreciated the vertical roller 117 will ideally be sized for its intended application, ease of manufacturability is better facilitated if the intended application permits identically sized rollers to be used for both the rollers that are horizontally oriented (e.g., rollers 112) and vertically oriented (e.g., rollers 117). The same holds true for male-type fasteners 116, which can be identical and/or deviate from the design of the male-type fasteners 115 depending on whether the intended application permits.

FIGS. 5-6 also shows the design of the wheel pin plate itself can be varied depending on the position of the wheel pin plate relative to the fork 101. As shown in FIG. 5, the wheel pin plate is rather small in comparison to the wheel pin, while in FIG. 6, the wheel pin plate can be an elongated rectangular allowing the position of the roller(s) to be extended beyond the physical limits of the distal end of the forks 101. Additional details of rollers 112/117 are further emphasized in FIGS. 29-31, discussed infra.

Figure 7:
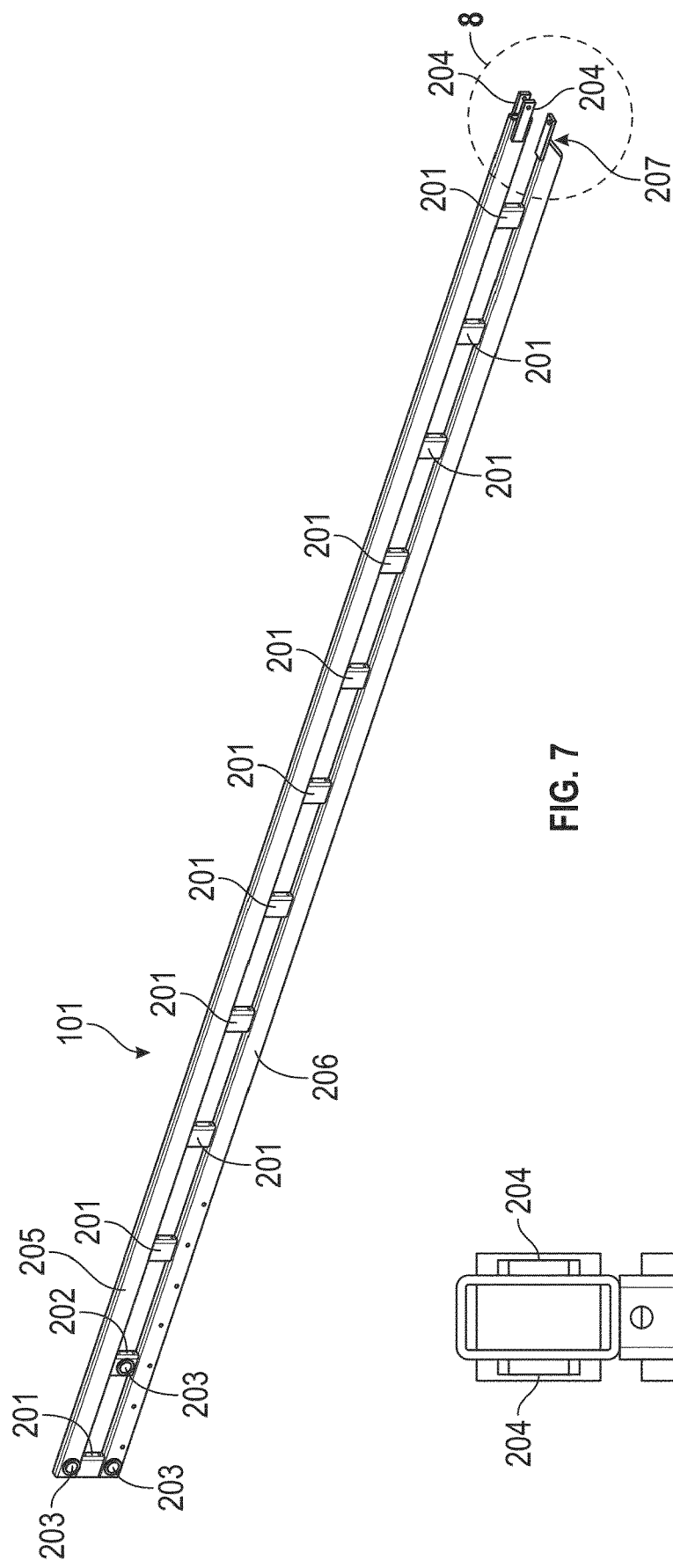
FIG. 7 shows a perspective, component view of one of the forks shown in FIG. 1.

FIG. 7 further emphasizes exemplary aspects of the forks 101. Though there exist embodiments the forks 101 can comprise one solid member, the forks 101 shown in the figure can be beneficially comprise upper and lower beams 205, 206, which allow for the horizontally oriented rollers 112 to be spaced therebetween. To maintain a constant spacing between said upper and lower beams 205, 206, vertical spacers 201 can be positioned between and equidistantly placed along longitudinal (axial) axes of the upper and lower beams 205, 206 of the forks 101. Additional details of typical vertical spacer 201 are further emphasized in FIGS. 25-28, discussed infra.

In lift assemblies 100 beneficially employing at least three connecting shafts 102, one or more of the vertical spacers 201 can be a perforated spacer 202. As shown, it is preferred the second vertical spacer 201 be a perforated spacer 202 with a brick-like shape with a large central aperture allowing for the third connecting shaft 102 to pass therethrough.

In some embodiments, the connecting shafts 102 can also pass-through bushings 203. The bushing 203, also known as a bush, can be an independent plain bearing inserted into the forks 101 and/or perforated spacers 202 to provide a bearing surface for rotary applications. The design of the bushing 203 can be solid (sleeve and flanged), split, clenched, and the like. A sleeve, split, or clenched bushing is a cylindrical sleeve of material with an inner diameter ("ID"), outer diameter ("OD"), and length. A solid sleeved bushing is solid all the way around, a split bushing has a cut along its length, and a clenched bearing is similar to a split bushing but with a clench (or clinch) across the cut connecting the parts. A flanged bushing is a sleeve bushing with a flange at one end extending radially outward from the OD. The flange is used to positively locate the bushing when it is installed or to provide a thrust bearing surface. A linear bushing does not need to be pressed into the forks 101 and/or perforated spacer 202, but rather can be secured with a radial feature. Two such examples include: (i) two retaining rings, or (ii) a ring that is molded onto the OD of the bushing that matches with a groove in the housing, thereby durably preventing forces acting on the bushing 203 to press the bushing 203 out of the member it is secured within.

Figure 8:
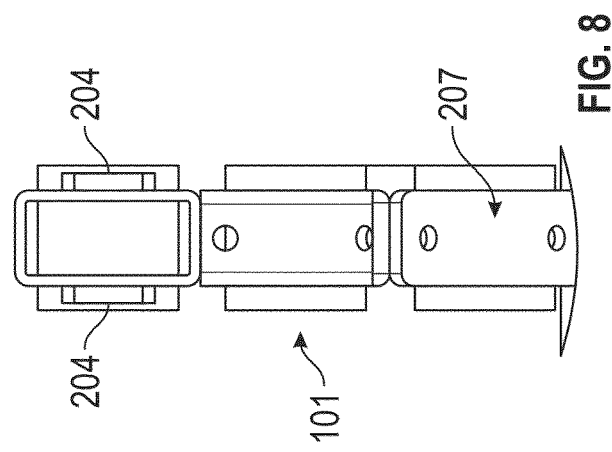
FIG. 8 shows a detailed, elevational view of a distal end of the fork shown in FIG. 7.

FIG. 7 also maps details of the distal ends of upper and lower beams 205, 206 by way of FIG. 8. One component that can be shown in FIG. 8 is end cap 207, which is otherwise hard to see in FIG. 7. The end cap 207 can, for example, comprise rubber and can act as a gasket to prevent water and other contaminants from entering the lower beam 206 during operation. The end cap 207 may thus be secured to the lower beam 206 by interference fit. Alternatively, the end cap 207 can comprise a rigid metallic alloy and can be fastened to the lower beam 206 by fasteners. Similar end cap(s) could be employed with the upper beam 205, though one is not expressly shown in FIG. 8.

FIGS. 9-10 shows details of the left pocket 104. The left pocket 104 includes body 301. As shown, the body 301 can be a hollow rectangular prism with rounded edges. At a proximate end of the body 301, there can exist reinforcements 302-305 that substantially surrounding a perimeter the body 301. The reinforcements can include a bottom reinforcement 302, side reinforcements 303, and top reinforcements 304-305. The top reinforcements can be divided into identically sized reinforcements, or as shown, can comprise a top, short reinforcement 304 and a top, long reinforcement 305. A gap will exist in a space between the top reinforcements 304-305, and this gap may be identical in width to the distance between L-brackets 306 attached to a top surface of the left pocket body 301 and slightly larger than the lower beam 206 of the forks 101. The distance between the L-brackets 306, which face outwardly from one another, is determined by the thickness of the lower beam 206 of the forks 101 because the lower beam 206 of the forks is intended to sit between the L-brackets 306. To secure the L-brackets 306 to the lower beam 206, male-type fasteners can be inserted through apertures 307 in the L-brackets 306.

Figure 12:
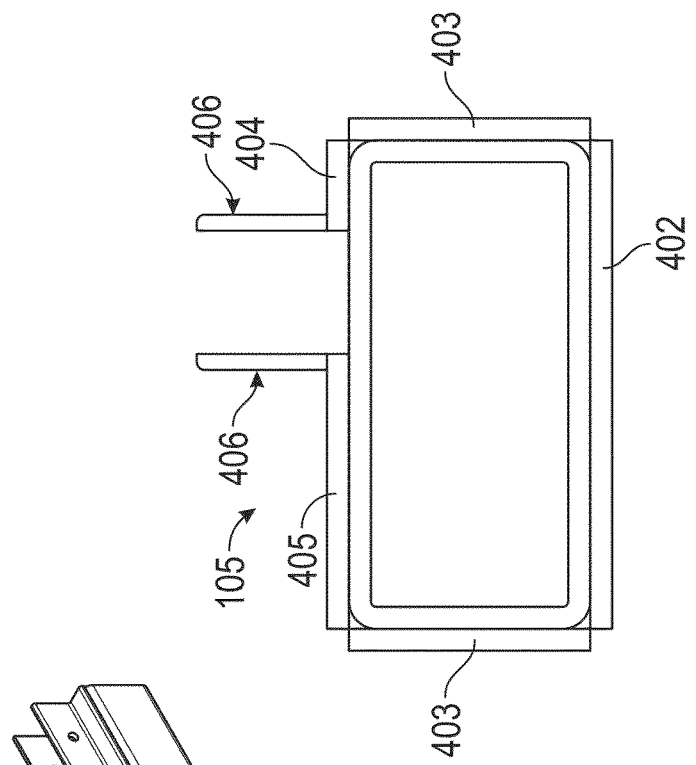
FIG. 12 shows an end, elevational view of the right pocket shown in FIG. 11.
Figure 11:
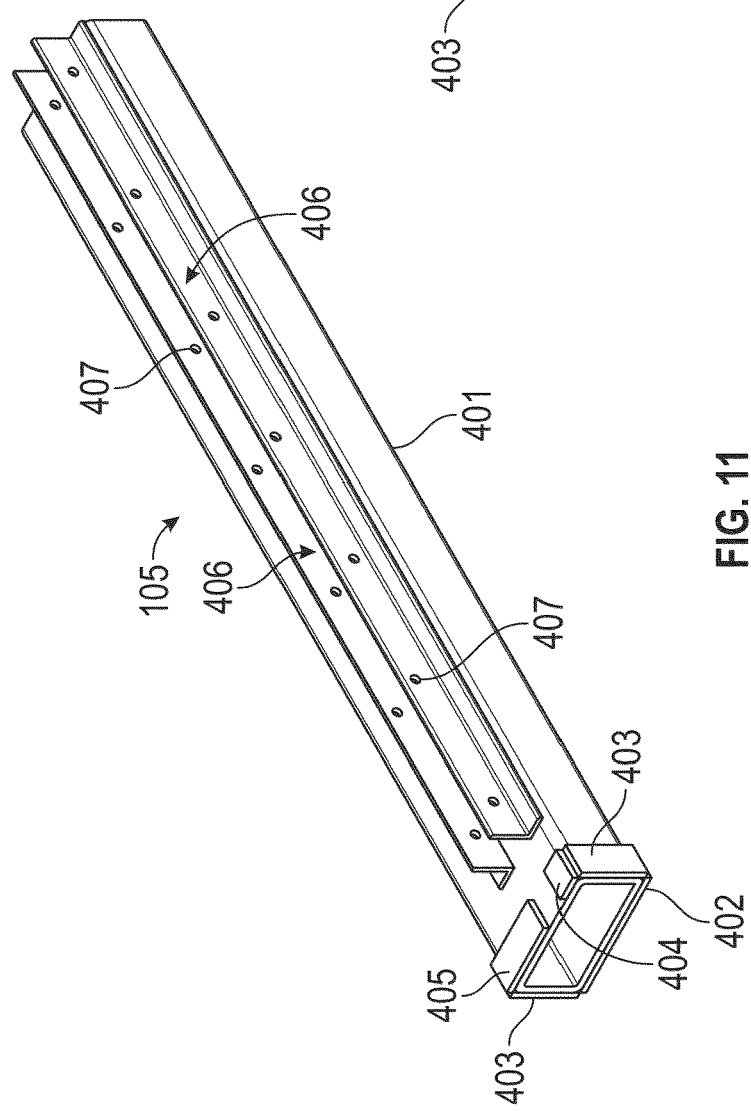
FIG. 11 shows a perspective, component view of the right pocket shown in FIG. 1.

FIGS. 11-12 show details of the right pocket 105. The right pocket 105 can be a substantially mirror image of the left pocket 104 shown in FIGS. 9-10. The present disclosure is not limited to such use of mirrored configurations for pockets 104, 105. In some embodiments, identical pockets can be used, even if said use of identical pockets creates asymmetry in the lift assembly 100. More than one bracket 306/406 could be used per pocket 104, 105.

FIGS. 13-15 show further details of the lower beam 206 that cannot be easily seen in the assembled configurations of FIGS. 1-2 and/or the "zoomed out" view seen in FIG. 7. In particular, a circular aperture 501 hidden in previous views by bushings 203 can be seen. The circular aperture 501 is sized so as to receive therethrough connecting shaft(s) 102.

Also shown are lower beam bracket apertures 502 that correspond with the apertures 307/407 of the L-shaped brackets, which is shown in further detail in FIG. 16. Lower beam bracket apertures 502 can be collinearly arranged. In collinear arrangements, care should be taken such that the collinear arrangement results in robust securement. The bolt angle 600 shown in FIG. 17 can also affect securement, though most often a normal angle will be preferred. Beneficially, FIGS. 13-16 show one effective example for a configuration of the lower beam bracket apertures 502 and bracket apertures 307/407, each of same being staggered into two rows of collinearly arranged apertures. This allows for securement of the lower beam 206 and the pockets 104, 105 to take place outside of a single plane. In some embodiments, there will exist a greater number of lower beam bracket apertures 502 than the number of bracket apertures 307/407 such that the bracket and pocket 104/105 can be interchangeably secured to the lower beam 206 at various positions.

Further shown in FIGS. 13-15 are lower beam wheel pin apertures 503, 504, which penetrate the side of the lower beam 206. The lower beam wheel pin apertures 503, 504 help secure the wheel pin assembly 110 to the lower beam 206. The lower beam distal angle 505 shown in FIG. 13 can be approximately forty-five degrees (45°), between thirty degrees (30°) and sixty degrees (60°), or even more preferably between fifteen degrees (15°) and seventy-five degrees (75°).

Figure 20:
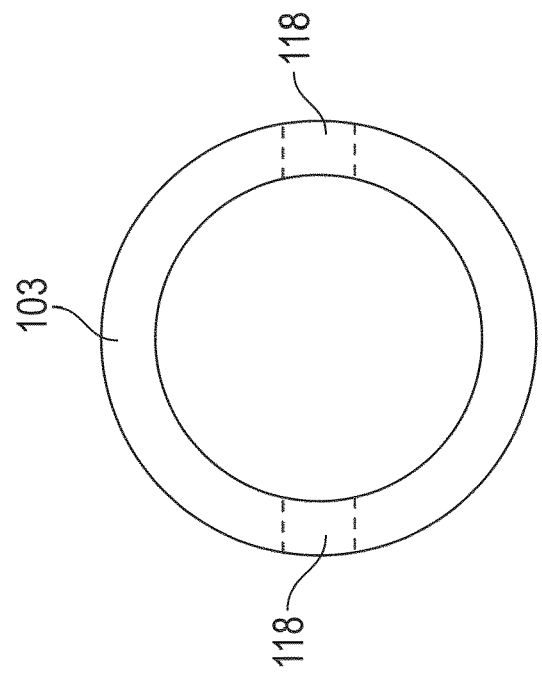
FIG. 20 shows a top, elevational view of the collar shown in FIG. 18 with internal features shown within hidden lines.
Figure 19:
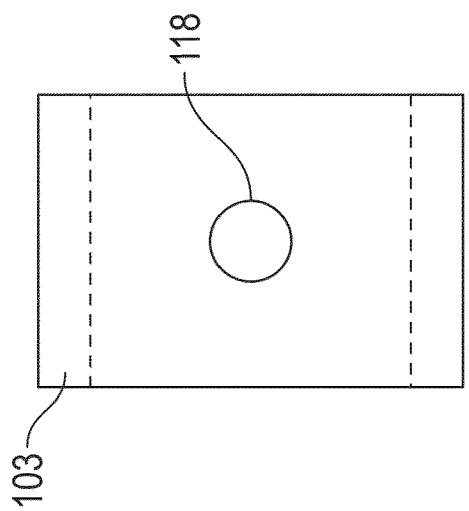
FIG. 19 shows a circumferential, elevational view of the collar shown in FIG. 18 with internal features shown within hidden lines.
Figure 18:
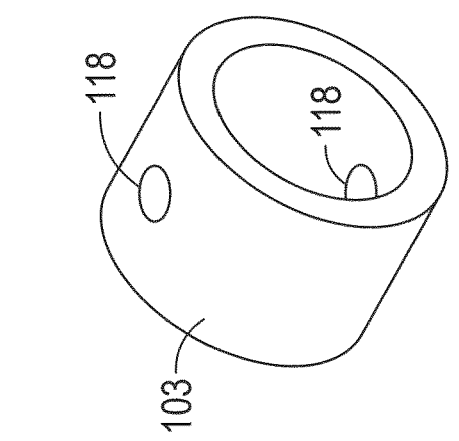
FIG. 18 shows a perspective, component view of the collar of the lift assembly shown in FIG. 1.
Figure 28:
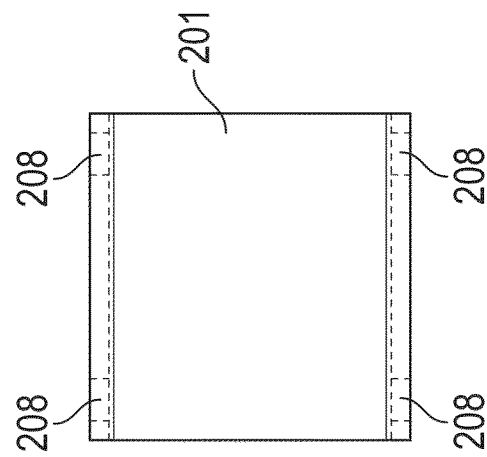
FIG. 28 shows a side, elevational view of the vertical spacer of FIG. 25 with internal features shown within hidden lines.
Figure 26:
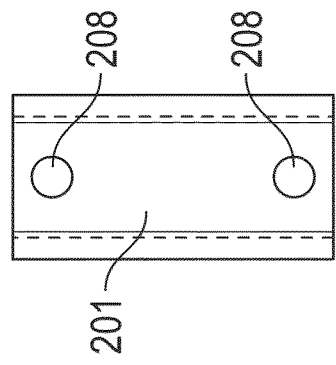
FIG. 26 shows a side, elevational view of the vertical spacer of FIG. 25 with internal features shown within hidden lines.
Figure 27:
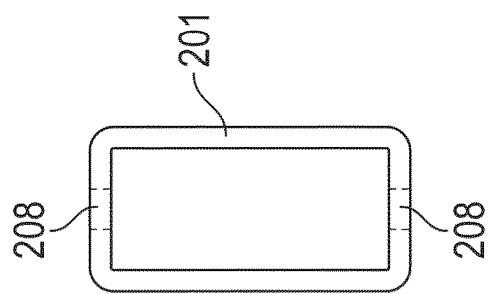
FIG. 27 shows a top, elevational view of the vertical spacer of FIG. 25 with internal features shown within hidden lines.
Figure 25:
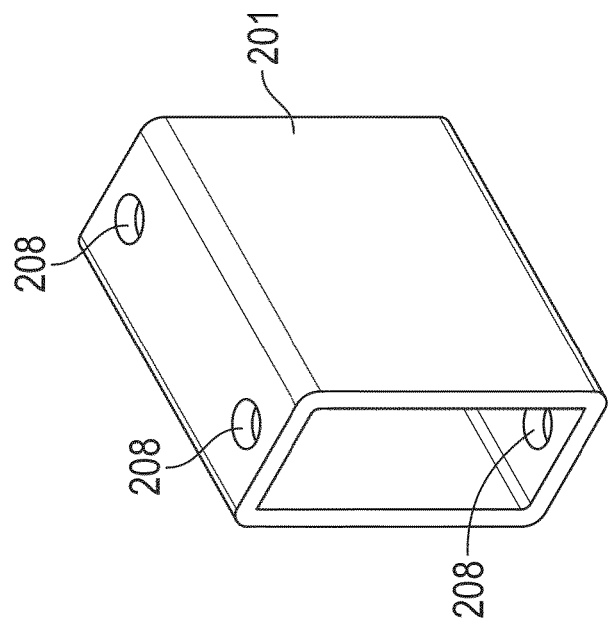
FIG. 25 shows a perspective, component view of one of the vertical spacers of the fork shown in FIG. 7.

FIGS. 18-20 show further details of exemplary collars 103 which can be secured to the ends of the shafts 102. As shown, the collars 103 can comprise annular prisms (i.e., hollow cylinders not having an enclosed top or bottom surface) with opposing apertures 118 included at opposite sides of the circumferential of the annular prism. The opposite position of the apertures 118 can allow for a male-type fastener to pass through both of the oppositely oriented apertures 118.

FIG. 21-24 show further details of the wheel pin plate(s) 114, which in a non-limiting example can be a solid rectangular prism(s) with rounded edges and a small aperture 119 and large aperture 120 extending therethrough. The small aperture 119 and large aperture 120 can correspond with lower beam wheel pin apertures 503, 504.

FIG. 25-28 show further details of non-perforated vertical spacers 201, which in a non-limiting example can be hollow rectangular prisms with rounded edges and a pair of small apertures 208 and large aperture 120 extending therethrough.

Figure 31:
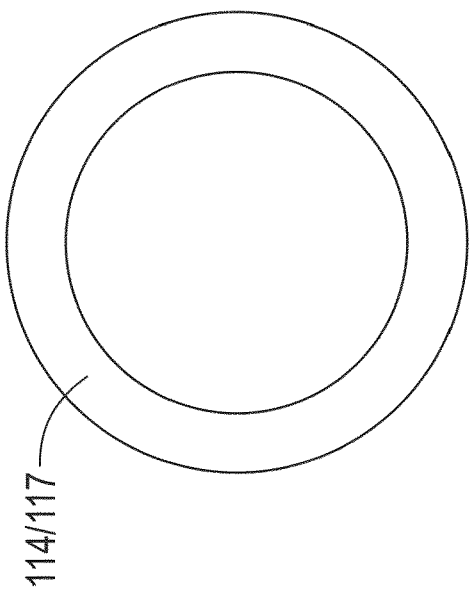
FIG. 31 shows a top, elevational view of the roller of FIG. 29.
Figure 30:
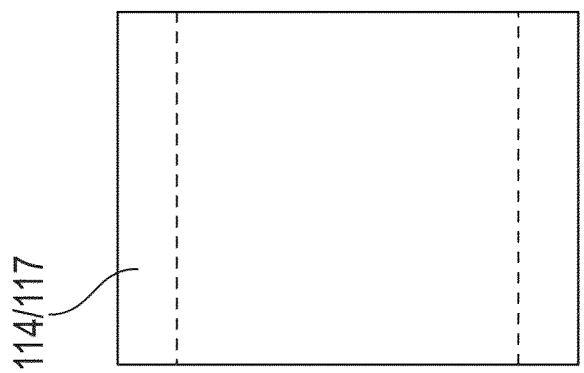
FIG. 30 shows a side, elevational view of the roller of FIG. 29 with internal features shown within hidden lines.
Figure 29:
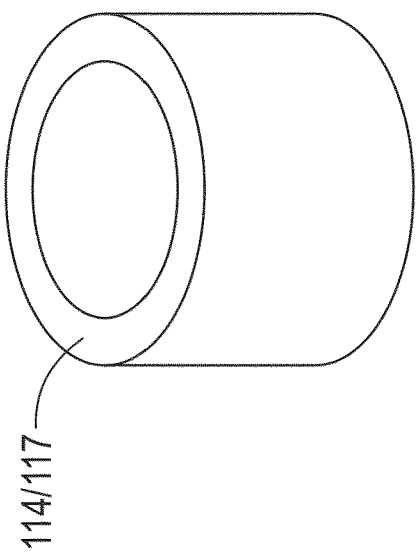
FIG. 29 shows a perspective, component view of one of the rollers of the fork shown in FIG. 7.

FIGS. 29-31 show further details of rollers 112/117, which in a non-limiting example are annular shaped wheels. The annular portion of the wheel can be made up a single rigid material. In alternative embodiments, the wheels can be made of inflatable tires, tracks, and/or other objects which can translate rotational movement into linear movement in other objects.

Figure 32:
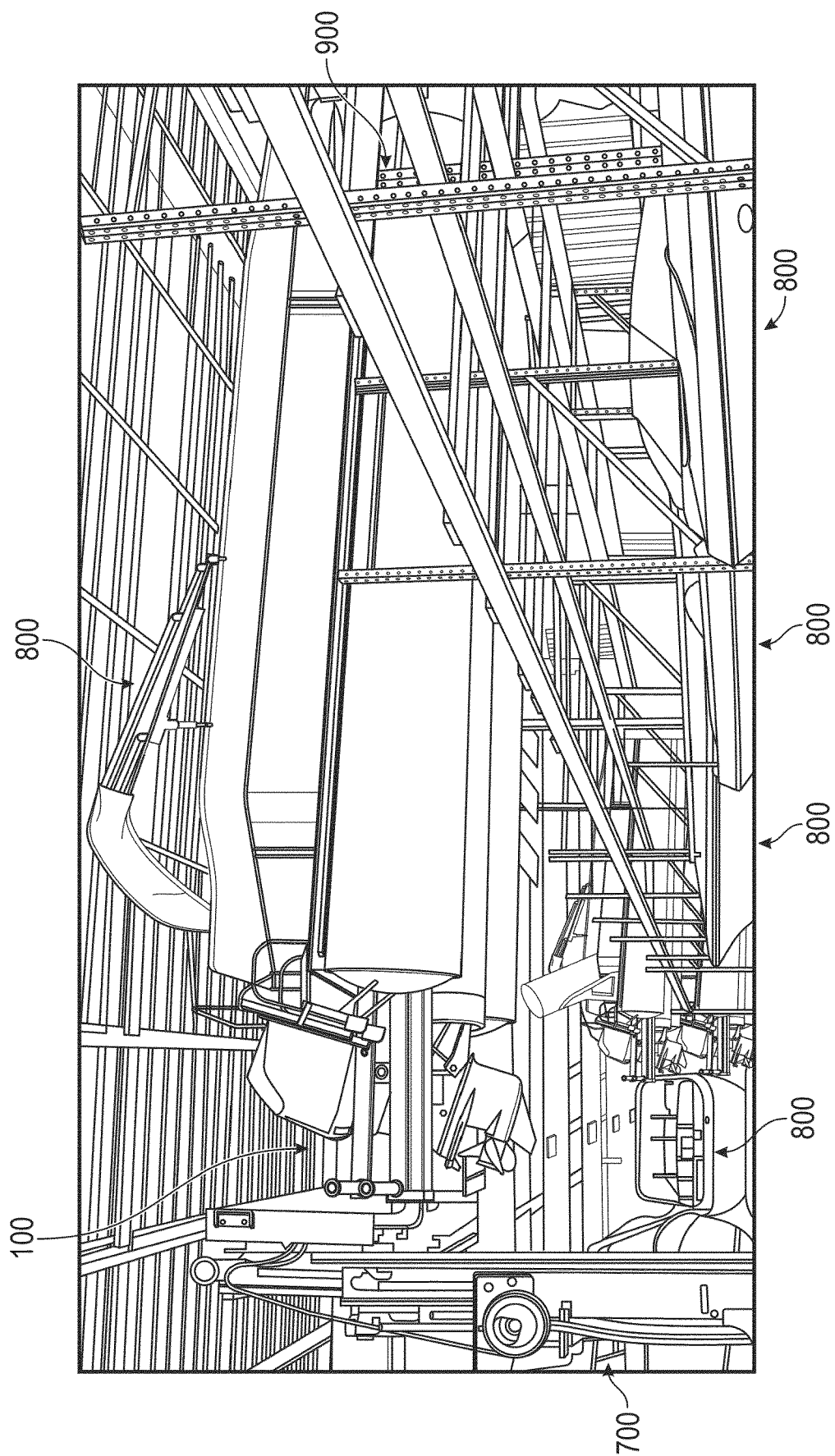
FIG. 32 shows an environmental, photographic view of use of an exemplary lift assembly similar to the one shown in FIG. 1 so as to load a nautical vehicle onto a rack.
Figure 33:
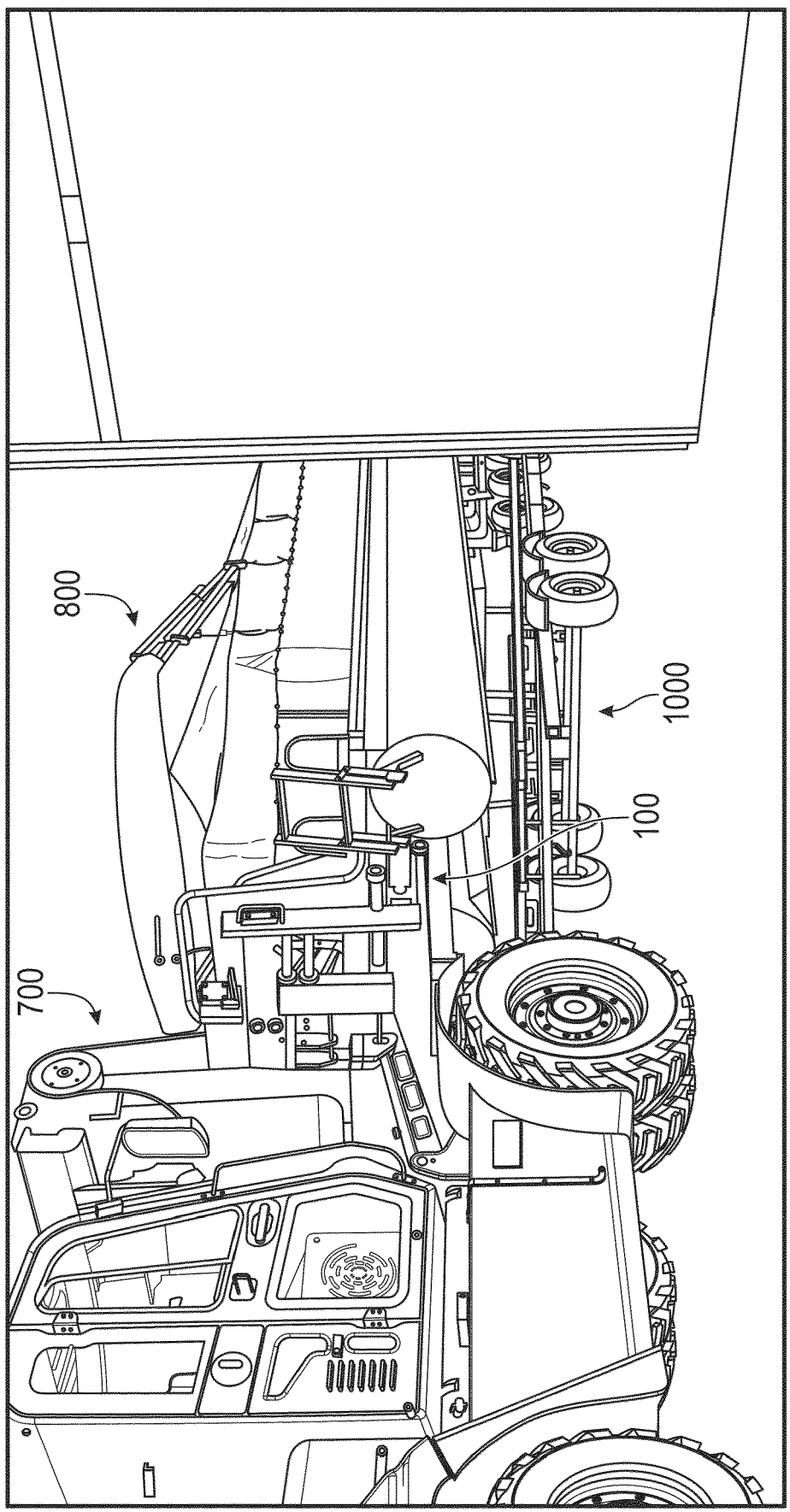
FIG. 33 shows an environmental, photographic view of use of an exemplary lift assembly similar to the one shown in FIG. 1 so as to load a nautical vehicle onto a boat trailer.

Boat forks 700 are found in marinas, boathouses, and other facilities housing nautical vehicles 800, as shown in FIGS. 32-33. The boat fork 700 is similar to the more generalized forklift in that the boat fork is a powered industrial truck used to lift and move materials over short distances. The boat fork 700 is rated for loads at a specified maximum weight and a specified forward center of gravity. This information can be located on a nameplate provided by the manufacturer of the boat fork 700. Boat fork operation is facilitated by rear-wheel steering, as this aspect increases maneuverability in tight cornering situations, such as the close proximity in which nautical vehicles 800 are stored in racks 900. The boat fork 700 can be configured such that there is no caster action while steering, such that a steering force does not have to be applied to maintain a constant rate of turn.

The boat fork 700 also features tall masts, heavy counterweights, and special paint to resist seawater-induced corrosion. Boat forks 700 are unique among most other forklifts in that they can also feature a negative lift cylinder. This type of cylinder allows can allow the forks 101 to actually descend lower than ground level. Such a functionality is often necessary because the ground upon which the boat fork 700 operates is higher than water levels below. Additionally, boat forks 700 can feature some of the longest forks 101 available, with some up to and greater than twenty-four feet long (e.g., eighteen feet, twenty feet, twenty-eight feet, thirty-two feet, etc.). The forks 101 are also typically coated in rubber to prevent damage to the hull of the boats that rest on them. Manufacturers of boat forks include the likes of Wiggins (Manchester, NH), Hoist (East Chicago, IN), and Toyota (Aichi, Japan).

An important aspect of the present invention is to mitigate instability in the boat fork 700 during operation. The boat fork 700 and load from the nautical vehicle 800 as a combination can continually vary center of gravity with every movement of the load. The boat fork 700 should thus be configured to never negotiate a turn at speed with a raised load, where centrifugal and gravitational forces may combine to cause a disastrous tip-over accident. The boat fork 700 can further be designed with a load limit for the forks 101 which is decreased with fork elevation and undercutting of the load from the nautical vehicle 800 (i.e., when a load does not butt against the fork 101). A loading plate for loading reference is usually located on the boat fork 700 alongside said information specifying a specified maximum weight and a specified forward center of gravity. The boat fork 700 can be fitted with safety equipment such as a cage.

Boat forks 700 can thus be an important tool to ensure smooth operations at a marina or a boathouse. When racking and untracking nautical vehicles 800, the boat fork 700 may need to travel inside a storage bay or a rack 900 that is more than one boat length deep. In some embodiments, drivers of the nautical forklift 700 can be guided into the rack 900 through guide rails on the floor and the pallet is placed on cantilevered arms or rails. These maneuvers are most easily completed with well-trained operators. Since unracking every nautical vehicle 800 typically requires the fork truck to enter the storage structure, damage is more common than with other types of storage. In designing a drive-in system, dimensions of the fork truck, including overall width and mast width, must be carefully considered. The present invention allows for optimal selection of these dimensions for the fork truck because the connecting shafts 102, collars 103, adjustable pockets 104, 105 of the improved lift assembly 100 can allow the distance between the forks 101 to be varied independently from the design of the fork truck. In other words, the dimensions of the fork truck can be optimized for safety in the most rigorous of applications and/or based upon the dimensions of the boathouse/marina, rather than varying between each and every application driven by vastly varying size of nautical vehicles.

In some embodiments, hydraulics of the boat fork 700 are controlled either with levers directly manipulating hydraulic valves or by electrically controlled actuators, using smaller "finger" levers for control. The latter allows more freedom in ergonomic design. To control, raise, and lower the forks 101, the operator of the boat fork 700 can tilt the mast to compensate for a nautical vehicle's tendency to angle the forks 101 toward the ground and risk the nautical vehicle 800 slipping off the forks 101. Tilt also provides a limited ability to operate on non-level ground.

The removable pockets 104, 105 can be selectively secured to the forks 101 of the boat fork 700 based upon a size of the nautical vehicle. In so doing, an optimal distance between said forks 101 will be determined. This better allows boat forks 700 to be used in combination with the lifting assembly 100 so as to lift the nautical vehicles 800 in and out of storage racks 900 (FIG. 32) and to allow for transport to and from said storage racks 900.

For example, to unload a nautical vehicle 800 from the rack 900, the nautical vehicle 800 can be loaded onto the forks 101 (unloaded from the rack 900) of the boat fork 700 by actuating the forks 101 upward from below the base of the nautical vehicle 800 so as to lift the nautical vehicle 800 with the boat fork 700. The forks 101 can then be retracted at a substantially constant elevation toward the boat fork 700 until the forks 101 are substantially adjacent the boat fork 700. The forks 101 can then be actuated to a lower transport position so that the nautical vehicle 800 can be transported by the boat fork 700 from a first location on land to a second location on land.

Then, to load a nautical vehicle 800 back onto a rack 900 (presuming the nautical vehicle 800 has already been loaded onto forks 101), the forks 101 may first be actuated to an elevation just above where the nautical vehicle 800 will be stored. Then, the forks 101 can be extended forward until the nautical vehicle 800 is positioned adjacent to where the nautical vehicle 800 will be stored. The forks 101 can then be actuated downward until the load of the nautical vehicle 800 is released from the forks 101 and onto rack 900. The forks 101 are then ideally returned further download and retracted so as to be put into a transport without contacting the nautical vehicle 800. This will allow the boat fork 700 to be driven to other locations and to be use for other applications around (both inside and outside) the boathouse and/or marina.

The aforementioned techniques and actuation of said forks 101 will also allow the boat fork 700 to maneuver the nautical vehicle 800 onto a boat trailer 1000 (FIG. 33), into the water, and/or remove the nautical vehicle 800 from the boat hoist/trailer when the boating activity is finished.

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

List of Reference Characters

| | |
|---|---|
| 100 | lift assembly |
| 101 | fork |
| 102 | connecting shaft |
| 103 | collar |
| 104 | left pocket |
| 105 | right pocket |
| 106 | connecting shaft bolt |
| 107 | locknut |
| 108 | washer |
| 109 | pocket bolt |
| 110 | wheel pin assembly(ies) |
| 111 | main roller spacer |
| 112 | horizontal roller |
| 113 | end roller spacer |
| 114 | wheel pin plate |
| 115 | horizontal roller male fastener |
| 116 | vertical roller bolt |
| 117 | vertical roller |
| 118 | collar aperture |
| 119 | wheel pin plate smaller aperture |
| 120 | wheel pin plate larger aperture |
| 201 | vertical spacer |
| 202 | perforated spacer |
| 203 | shaft bushing |
| 204 | wheel mounting plate |
| 205 | upper beam |
| 206 | lower beam |
| 207 | end cap |
| 208 | vertical spacer aperture |
| 301 | left pocket body |
| 302 | bottom reinforcement |
| 303 | side reinforcement |
| 304 | top short reinforcement |
| 305 | top long reinforcement |
| 306 | left pocket bracket |
| 307 | bracket apertures |
| 401 | right pocket body |
| 402 | bottom reinforcement |
| 403 | side reinforcement |
| 404 | top short reinforcement |
| 405 | top long reinforcement |
| 406 | right pocket bracket |
| 407 | bracket apertures |
| 501 | lower beam connecting shaft aperture |
| 502 | lower beam bracket apertures |
| 503 | lower beam first wheel plate aperture |
| 504 | lower beam second wheel plate aperture |
| 505 | lower beam distal angle |
| 600 | bolt angle |
| 700 | forklift |
| 800 | boat |
| 900 | rack |
| 1000 | boat trailer |

Glossary

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

"Portaging" is the practice of carrying watercraft or cargo over land, either around an obstacle in a river, or between two bodies of water. A path where items are regularly carried between bodies of water is also called a "portage."

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

What is claimed is:

1. A lift assembly for a forklift or a mobile boat hoist capable of transporting nautical vehicles comprising:
a pair of elongated forks having distal and proximate ends, said pair of elongated forks being oriented substantially parallel to one another;
shafts passing through and connecting the pair of elongated forks to one another near the proximate ends;
interchangeable pockets supporting an underside of said elongated pair of forks; and
at least two horizontally oriented rollers longitudinally dispersed throughout each fork of the pair of elongated forks to facilitate longitudinal movement of the nautical vehicles along said pair of elongated forks and to prevent damage to the nautical vehicles as the nautical vehicles are loaded onto the pair of elongated forks.

2. The lift assembly of claim 1 further comprising a wheel pin assembly with vertically oriented pins extending from an upper beam of the pair of elongated forks through the horizontally oriented rollers to a lower beam of the elongated forks.

3. The lift assembly of claim 2 further comprising wheel pin mounting plates configured to fasten, via nuts and bolts, the wheel pin assembly to an upper surface of said upper beam or to a lower surface of said lower beam.

4. The lift assembly of claim 1 further comprising vertically oriented end rollers positioned at the distal ends of said pair of elongated forks.

5. The lift assembly of claim 1 wherein the forks are constructed from galvanized steel.

6. The lift assembly of claim 1 further comprising collars removably bolted to ends of the shafts.

7. The lift assembly of claim 1 wherein the pockets are removably bolted to the pair of elongated forks.

8. The lift assembly of claim 1 wherein the shafts pass through bushings.

9. The lift assembly for a forklift or a mobile boat hoist capable of transporting nautical vehicles comprising:
- a pair of elongated forks having distal and proximate ends, said pair of elongated forks being oriented substantially parallel to one another;
- shafts passing through and connecting the pair of elongated forks to one another near the proximate ends;
- interchangeable pockets supporting an underside of said elongated pair of forks;
- wherein the pair of elongated forks comprise parallelly oriented upper and lower beams, said upper and lower beams mechanically connected by a plurality of vertical spacers longitudinally dispersed through said pair of elongated forks.

10. A lift assembly for a forklift or a mobile boat hoist capable of transporting nautical vehicles comprising:
- a pair of elongated forks having distal and proximate ends, said pair of elongated forks being oriented substantially parallel to one another;
- shafts passing through and connecting the pair of elongated forks to one another near the proximate ends;
- interchangeable pockets supporting an underside of said elongated pair of forks;
- wherein the interchangeable pockets comprise L-brackets welded to an outer portion of an upper surface of said interchangeable pockets, said L-brackets arranged in parallel relation, oriented to face away from one another, and positioned a distance slightly greater than a thickness of said pair of elongated forks.

11. The lift assembly of claim 10 wherein the lower beams comprise apertures allowing the L-brackets to be fastened to said forks.

12. A lift assembly for a forklift or a mobile boat hoist capable of transporting nautical vehicles comprising:
- a pair of elongated forks having distal and proximate ends, said pair of elongated forks being oriented substantially parallel to one another;
- shafts passing through and connecting the pair of elongated forks to one another near the proximate ends;
- interchangeable pockets supporting an underside of said elongated pair of forks; and
- reinforcements substantially surrounding a perimeter of said removable pockets toward the proximate ends of the forks, wherein a gap exists between a top, short reinforcement and a top, long reinforcement of said reinforcements, a distance of said gap being substantially equal to said distance between said L-brackets.

* * * * *